United States Patent [19]

Nishijima et al.

[11] Patent Number: 4,707,749
[45] Date of Patent: Nov. 17, 1987

[54] ADDRESS CODE INSERTING SYSTEM FOR VIDEO TAPE RECORDING APPARATUS

[75] Inventors: Hideo Nishijima; Kaneyuki Okamoto, both of Katsuta; Takayasu Ito, Yokohama; Shuji Toyoshima, Ibaraki, all of Japan

[73] Assignee: Hitachi, Ltd., Tokyo, Japan

[21] Appl. No.: 890,924

[22] Filed: Jul. 31, 1986

[30] Foreign Application Priority Data

Aug. 7, 1985 [JP] Japan .................................. 60-172331

[51] Int. Cl.⁴ ....................... G11B 27/02; G11B 15/06
[52] U.S. Cl. .................................. 360/14.3; 360/72.2; 360/74.4
[58] Field of Search ............................ 360/14.1–14.3, 360/72.2, 74.4

[56] References Cited

U.S. PATENT DOCUMENTS

| | | | |
|---|---|---|---|
| 3,647,951 | 3/1972 | Rose, Jr. .............................. | 360/14.2 |
| 3,739,086 | 6/1973 | Heather ........................ | 360/72.2 X |
| 4,007,491 | 2/1977 | Bolick, Jr. et al. ................. | 360/74.4 |
| 4,167,228 | 9/1979 | Tobey ............................. | 360/14.3 X |
| 4,532,560 | 7/1985 | Williams ........................ | 360/14.1 X |

FOREIGN PATENT DOCUMENTS 57-195638 6/1981 Japan .
59-139157 8/1984 Japan .

OTHER PUBLICATIONS

"A New Method of Extracting Time & Control Code Information for Video Tape Editing", Sekiguchi; NHK LAB Note; No. 284; Jan. 1983.
"An Automatic Video Tape Editing/Splicing System Using a Process Computer", Fujimura et al.; SMPTE Journal, Mar. 67, vol. 76, pp. 169–176.
"CM Editing System for TV Broadcasting"; Motohashi et al.; NEC R&D (Japan), No. 61, Apr. 1981, pp. 32–41.

Primary Examiner—Aristotelis M. Psitos
Attorney, Agent, or Firm—Antonelli, Terry & Wands

[57] ABSTRACT

The invention relates to a control signal recording apparatus of a magnetic recording/reproducing apparatus for recording a video signal on a video track on a magnetic tape and reproducing the recorded video signal. There is provided control signal recording means for inserting a cue signal and a desired address signal as two kinds of pulse signals having different duty ratios onto a control track and the head portion of each video information. Due to this, various kinds of control signals such as cue signal, address signal, and the like can be easily recorded, erased, rewritten, and the like. Also, the address signal can be inserted after the recorded cue signal. Therefore, the editing and head search of the tape can be easily performed.

3 Claims, 11 Drawing Figures

ADDRESS CODE INSERTING SYSTEM FOR VIDEO TAPE RECORDING APPARATUS

BACKGROUND OF THE INVENTION

The present invention relates to a magnetic recording/reproducing apparatus, e.g., a helical scan type video tape recorder for recording a video signal onto video tracks of a magnetic tape and reproducing the video signal recorded on the magnetic tape and, more particularly, to an apparatus for recording control signals in which control signals recorded on the magnetic tape such as, for example, cue signals for searching the heads corresponding to the respective recording start portions of a plurality of video information having different contents, address signals which are used to search the respective video information, and the like are recorded onto the control track of the magnetic tape.

Hitherto, as such a kind of apparatus, as disclosed in the Official Gazette of Japanese Patent Unexamined Publication No. 139157/84, there has been known the apparatus in which the head searching cue signals are recorded in the video track portions of a tape throughout the whole width of the tape by use of a whole-width erasing head (the erasing head is also commonly used to record the cue signals) and head searching operation of the tape is executed on the basis of the cue signals. On the other hand, as disclosed in the Official Gazette of Japanese Utility Model Unexamined Publication No. 195638/82, there has been known the apparatus in which two kinds of pulse signals of different duty ratios are recorded into the control track and the tape is moved fast or at a constant speed in accordance with the duty ratios of these pulse signals.

However, in any of these apparatuses, no consideration is paid to the means for easily realizing the recording, erasing, change (rewriting), and the like of the head search signal (cue signal), address signal, and the like of the video information.

SUMMARY OF THE INVENTION

It is an object of the present invention to eliminate the foregoing drawbacks of the conventional technologies and to provide a control signal recording apparatus in which various kinds of control signals such as cue signal, address signal, and the like can be easily recorded, erased, rewritten, and the like with a relatively simple system and at the same time, for the magnetic tape on which the cue signals have been already recorded, the address signal (absolute address) can be later inserted (recorded) subsequent to the cue signal.

To accomplish this object, according to the present invention, there is provided control signal recording means for inserting (recording) cue signal and desired address signal as two kinds of pulse signals having different duty ratios onto the control track and also in the recording start portions of respective video information (respective scenes).

According to the invention, the address code can be recorded after the recorded cue signal. Therefore, the editing, head search, and the like of the tape can be easily controlled.

DESCRIPTION OF THE PREFERRED EMBODIMENTS

Figure 1:
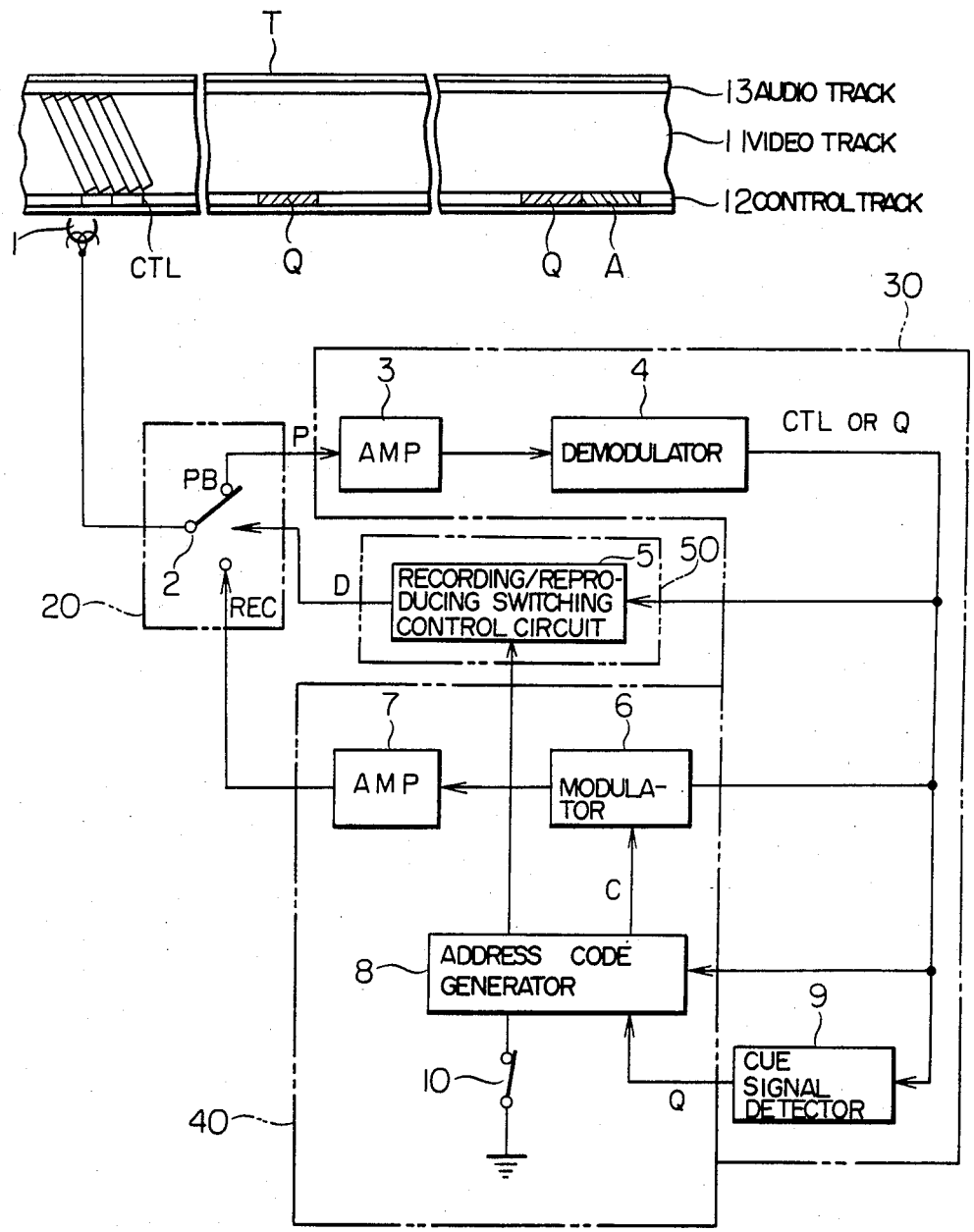
FIG. 1 is a block diagram showing a control signal recording apparatus according to the present invention.

An embodiment of the present invention will be described hereinbelow with reference to the drawings. FIG. 1 is a block diagram of a control signal recording apparatus of the invention. In the diagram, T denotes a magnetic tape. A video track 11, an audio track 13, and a control track 12 are respectively formed on the tape T as shown in the diagram. Video signals, audio signals, and control signals are respectively recorded as well-known formats in those tracks by video heads (rotary heads), audio heads, and control head of a generally well-known video tape recorder. A control head 1 is arranged so as to face the control track 12 on the tape T.

A recording/reproducing switching circuit 20 including a recording/reproducing switch 2 is connected to the control head 1.

Control signal discriminating means 30 is connected to a reproducing terminal PB of the switch 2 and comprises an amplifier 3, a demodulator 4, and a cue signal detector 9. The amplifier 3 amplifies a control signal P (CTL, Q) reproduced by the control head 1. The demodulator 4 is connected to the amplifier 3 and demodulates the duty ratio of the control signal (reproduced pulse) amplified by the amplifier 3. The cue signal detector 9 is connected to the domodulator 4 and detects a cue signal Q by discriminating whether the duty ratio of the control signal P demodulated by the demodulator corresponds to the control signal CTL for tracking control or corresponds to the cue signal Q for searching the head of the tape, which will be explained hereinafter.

An address signal generating means 40 includes a switch 10 to set the recording mode of an address code, a control circuit consisting of an address code generator 8, a duty modulator 6, and an amplifier 7.

The address code generator 8 is connected to the switch 10, cue signal detector 9 of the control signal discriminating means 30, and demodulator 4. When the switch 10 is turned on or when the detector 9 detects the cue signal Q and the generator 8 receives the cue signal Q, the generator 8 outputs a control signal (data "0" and "1") C consisting of a BCD code of, e.g., eight bits and synchronized with an output of the demodulator 4. In addition, the generator 8 counts an output of the detector 9 and automatically updates an address code, which will be explained hereinafter, thereby preventing the same address code from being generated.

The modulator 6 is connected to the address code generator 8 and the demodulator 4 of the control signal discriminating means 30 and receives an output signal of generator 8. The modulator 6 then modulates the duty ratio of the reproduced pulse (cue signal Q) of an output signal of the demodulator 4 and generates an address signal A. The duty ratio of the cue signal Q differs from the duty ratio of the address signal A as will be explained hereinafter.

The amplifier 7 is connected to the modulator 6 and a recording terminal REC of the switch 2 and amplifies an output, i.e., the address signal A of the modulator 6 and then leads the amplified signal to the switch 2.

Reference numeral 50 denotes recording means for providing the address signal of the address signal generating means 40 to the control head 1 through the switch 2 and thereby recording the address signal A onto the control track 12 on the magnetic tape T. The recording means 50 includes a recording/reproducing switching control circuit 5, connected to the address code generator 8 and demodulator 4, for receiving the outputs of both generator 8 and demodulator 4 and switching the switch 2 to the recording mode for a predetermined period of time.

In the above system, when the switch 2 is connected to the reproducing side PB as shown in the diagram and the apparatus is in the reproducing mode to reproduce the signal (pulse CTL, Q) recorded on the control track 12 on the tape T by the control head 1, the reproduced signal (pulse) P reproduced by the head 1 is supplied to the duty demodulator 4 through the switch 2 and reproducing amplifier 3. The demodulator 4 demodulates the duty ratio of the reproduced pulse. Due to the demodulation of the duty ratio of this pulse, it is possible to discriminate whether the reproduced pulse is the control signal CTL to be used for tracking control of the video tape recorder or the cue signal Q to search the head of the tape. Assuming that the reproduced pulse is the cue signal Q, the cue signal is supplied to the cue signal detector 9 and discriminated and detected by this detector. The cue signal Q is supplied to the address code generator 8. In response to this cue signal, the generator 8 outputs the control signal (data) C synchronized with the output of the demodulator 4. On the basis of this output signal, the duty modulator 6 and control circuit 5 are made operative synchronously with the output of the demodulator 4. The duty ratio of the reproduced pulse (control signal) is modulated by the modulator 6. The modulator 6 then generates the address signal A having a duty ratio different from that of the cue signal Q. At the same time, the control circuit 5 receives the leading edge of the output pulse of the demodulator 4 and generates a pulse signal in a period during the leading edge, for example, during 0.15-0.85 period as described later, then outputs a recording/reproducing switching signal D, during the output period of the control signal (data) C outputted from the address code generator 8, thereby switching the switch 2 to the recording side terminal REC for a predetermined period of time. Thus, the address signal A is supplied to the control head 1 through the recording amplifier 7 and the switch 2 and recorded after the cue signal Q in the control track 12 on the tape T by the head 1. The recording period of time of the address signal is set by the switching signal D of a proper timing by the control circuit 5 which receives the output of the address code generator 8 and operates.

Figure 2:
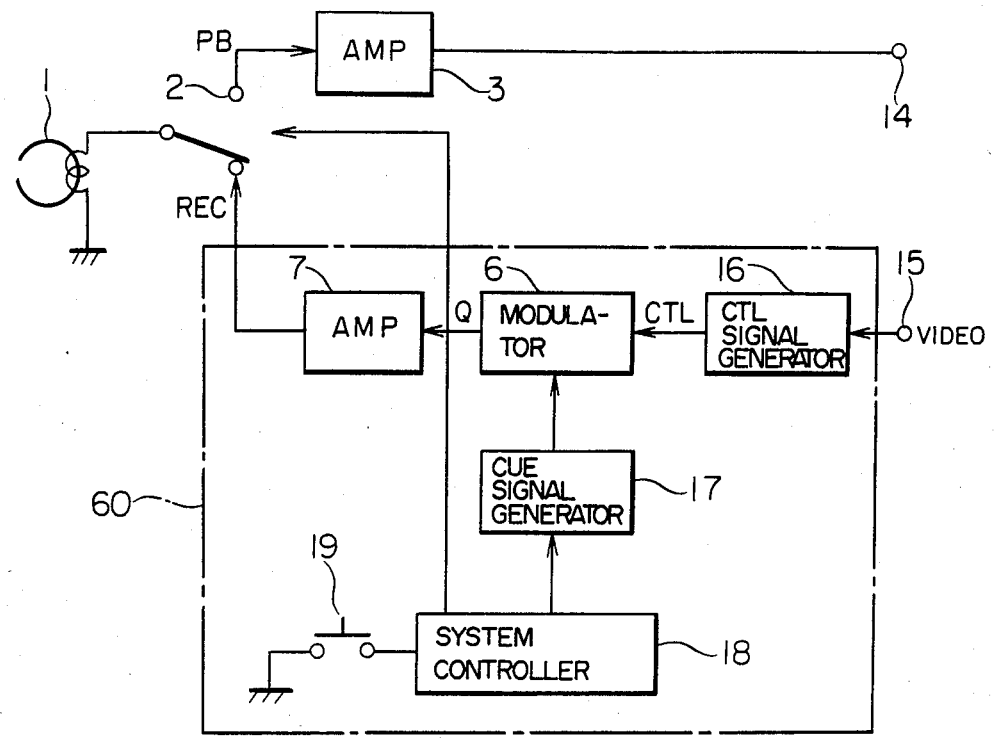
FIG. 2 is a block diagram showing a cue signal recording apparatus.

FIG. 2 is a block diagram of a cue signal recording apparatus. In this diagram, the same parts and elements as those in FIG. 1 are designated by the same reference numerals. Reference numeral 60 denotes cue signal generating means including a mode switch 19, a system controller 18, a cue signal generator 17, a control signal generator 16, the duty modulator 6, and the amplifier 7.

In the above embodiment, when the mode switch 19 of the cue signal generating means 60 is turned on, the system controller 18 switches the switch 2 to the recording side terminal REC and simultaneously makes the cue signal generator 17 operative for a predetermined period of time, thereby allowing an output of the generator 17 to be supplied to the modulator 6. The modulator 6 receives the output of the generator 17 and modulates the duty ratio of the control signal CTL of the generator 16 and outputs the cue signal Q. The cue signal Q is recorded onto the control track 12 on the magnetic tape T through the amplifier 7, switch 2, and head 1.

The recording formats of the cue signal and address signal will now be described with reference to FIGS. 3(a) and 3(b).

Figure 3:
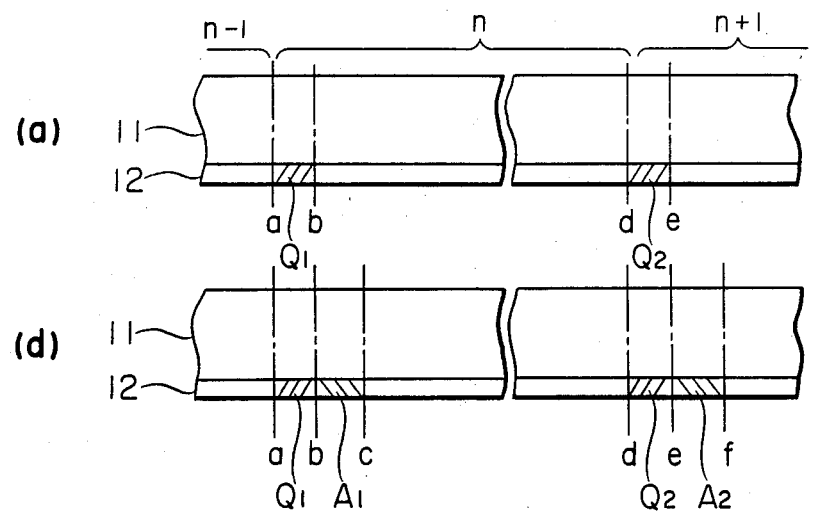
FIGS. 3(a), 3(b) are diagrams showing recording patterns on a magnetic tape.

FIG. 3(a) is a pattern diagram showing the recording format of the cue signal ($Q_1$, $Q_2$). FIG. 3(b) is a pattern diagram showing the recording formats of the cue signal Q ($Q_1$, $Q_2$) and address code A ($A_1$, $A_2$).

In the diagrams, the cue signal Q is recorded on the control track 12 (a to b, d to e) corresponding to the recording start portions of the respective video information (respective scenes $n-1$, n, $n+1$, ...) recorded on the video track 11. The address signal A is recorded in the control track 12 (b to c, e to f) subsequent to each cue signal (a to b, d to e). The recording signals having different duty ratios are provided on the control track 12 in a manner such as "1" signal (the period of a "high" level H occupies 50% or more of the whole period of time) and "0" signal (the period of a "high" level H occupies 20 to 30% of the whole period of time) as shown in, e.g., FIGS. 4(a) and 4(b), respectively. Since the leading edge of the control signal CTL is used as a control signal for use in tracking control of the video tape recorder, even if the duty ratio is modulated as mentioned above, no adverse influence will be exerted on the ordinary servo control system. The ordinary control signal CTL is recorded at a duty ratio above 50%, so that it is a "1" signal. On the other hand, the cue signal Q is recorded automatically or by switching means (switch 10) each time the recording is performed in the ordinary recording mode and is recorded by continuously recording the duty ratio "0" signal a plurality of times, e.g., thirty times or the like.

Figure 4:
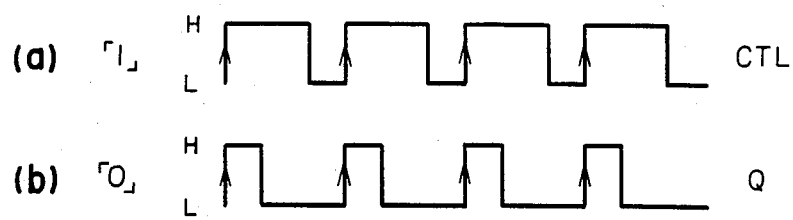
FIGS. 4(a), 4(b) are waveform diagrams showing recording signals having different duty ratios.
Figure 5:
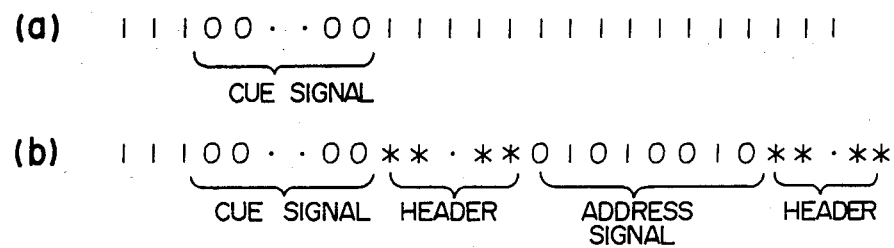
FIGS. 5(a), 5(b) are data diagrams showing examples of address codes.

The address signal A is recorded one by one as an absolute address for each scene in order to make it possible to easily search, at a later time, the magnetic tape having the recording pattern as shown in FIG. 3(a) which has been recorded in such a manner as mentioned above. Namely, as shown in FIG. 5(a), the modulated signal (pulses) recorded on the control track 12 are reproduced and when the cue signal Q, i.e., the duty ratio "0" signal is continuously detected a predetermined number of times, those reproduced pulses make the modulated signal recording pattern of which, as shown in FIG. 4(b), the first header signal, address signal (e.g., BCD code of eight bits), and second header signal (which is used when the data is reproduced by reversely moving the magnetic tape) have been respectively recorded after the cue signal Q.

Figure 6:
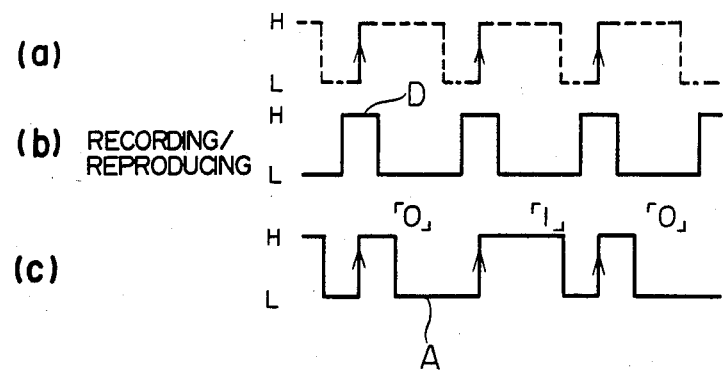
FIGS. 6(a) to 6(c) are waveform diagrams for explaining a method of recording an address signal.

Next, a method of recording the address signal will now be explained with reference to FIGS. 6(a) to 6(c). When the cue signal is detected, the control circuit 5 receives the output of the demodulator 4, i.e., the leading edge of the control signal having a waveform as shown in FIG. 6(a) and outputs a waveform D as shown in FIG. 6(b), i.e., a recording control signal which becomes a "high (H)" level for only a predetermined period of time of, e.g., 0.15 to 0.85 of a period. The switch 2 is switched to the recording side terminal REC by this control signal, thereby allowing the output of the recording amplifier 7 (i.e., address signal A) as shown in FIG. 6(c) to be provided to the control head 1. The output of the modulator 6 to be supplied to the recording amplifier 7 becomes a "high (H)" level synchronously with the leading edge of the output (waveform of FIG. 6(a)) of the demodulator 4. In accordance with the output C of the address code generator 8, the period at a "high (H)" level is set to 20 to 30% when the output C (i.e., address code) is "0", while the period at a "H" level is set to 50% or more when the address code is "1" (refer to the waveform A of FIG. 6(c)). On the other hand, the header signal is set to the signal (e.g., 011110) different from the other signals (address code and the like) and used to determine the timing to detect the address code.

As described above, according to the present invention, the following advantageous effects are derived.

1. Various kinds of control signals such as cue signal, address signal, and the like can be easily recorded, erased, rewritten, and the like by a simple system.

2. Since the address signal can be inserted after the cue signal which has already been recorded, the editing and head search of the tape can be easily controlled, and the like.

We claim:

1. A control signal recording apparatus of a magnetic recording/reproducing apparatus comprising:
   means for generating a cue signal consisting of a pulse signal for searching a tape;
   means for recording the cue signal from said cue signal generating means onto a control track of a magnetic tape;
   first circuit means for reproducing and detecting the cue signal recorded on the magnetic tape;
   second circuit means, connected to said first circuit means, for receiving said cue signal and generating an address signal different from said cue signal; and
   address signal recording means, connected to said second circuit means, for recording said address signal in the control track on said magnetic tape after said cue signal for a predetermined period.

2. A control signal recording apparatus according to claim 1, wherein said first circuit means comprises:
   a control head, arranged in contact relation with said control track on said magnetic tape, for reproducing a control signal recorded in said control track;
   a recording/reproducing switching circuit including a recording/reproducing switching switch connected to said head;
   a demodulator, connected to said switch of said recording/reproducing switching circuit, for demodulating a duty ratio of the control signal reproduced by said head; and
   a cue signal detecting circuit, connected to said demodulator, for discriminating the cue signal from the demodulated duty ratio, thereby detecting the cue signal,
   wherein said second circuit means comprises:
   address code generator means, connected to said cue signal detecting circuit and said demodulator of said first circuit means, for outputting a control signal synchronized with an output pulse of said demodulator when said control circuit means receives the cue signal of said cue signal detecting circuit; and
   a modulator, connected to said address code generator means and said demodulator, for receiving the control signal from said address code generator means and modulating the duty ratio of the output pulse from said demodulator and outputting the address signal different from said cue signal,
   and wherein said address signal recording means comprises:
   a recording/reproducing switching control circuit, connected to said address code generator means and said demodulator, for receiving the control signal of said address code generator means and the output pulse of said demodulator and setting said switch of said recording/reproducing switching means into the recording mode for a predetermined period of time, thereby allowing the address signal of said modulator to be led to said control head through the switch.

3. A control signal recording apparatus acording to claim 2, wherein said address code generator generates an address code consisting of a BCD code of eight bits.

* * * * *